US009699739B2

(12) United States Patent
Juang et al.

(10) Patent No.: US 9,699,739 B2
(45) Date of Patent: Jul. 4, 2017

(54) DETERMINATION OF DEVICE BODY LOCATION

(71) Applicant: Apple Inc., Cupertino, CA (US)

(72) Inventors: Ben-Heng Juang, Milpitas, CA (US); Hue Duc Tran, San Francisco, CA (US); Hung A. Pham, Oakland, CA (US); Adam S. Howell, Oakland, CA (US); Hengliang Zhang, San Jose, CA (US); Gunes Dervisoglu, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/292,750

(22) Filed: May 30, 2014

(65) Prior Publication Data
US 2014/0364162 A1  Dec. 11, 2014

Related U.S. Application Data

(63) Continuation-in-part of application No. 13/913,271, filed on Jun. 7, 2013.

(51) Int. Cl.
H04M 1/00 (2006.01)
H04W 52/14 (2009.01)
(Continued)

(52) U.S. Cl.
CPC ....... H04W 52/146 (2013.01); H04W 52/246 (2013.01); H04W 52/283 (2013.01);
(Continued)

(58) Field of Classification Search
CPC . H04W 52/246; H04W 52/52; H04W 52/283; H04W 52/367; H04B 1/3838;
(Continued)

(56) References Cited

U.S. PATENT DOCUMENTS 8,775,103 B1    7/2014  Jayaraj
2009/0305742 A1*  12/2009  Caballero ............ H04B 1/3838
                                                                455/566
(Continued)

FOREIGN PATENT DOCUMENTS

CN    102089989    6/2011
CN    103083025    5/2013
(Continued)

OTHER PUBLICATIONS

Translation in Office Action of Taiwanese Patent Application No. 103118136. Received Jan. 22, 2015. 3 pages.
(Continued)

Primary Examiner — Vladimir Magloire
Assistant Examiner — Majid Syed
(74) Attorney, Agent, or Firm — Fish & Richardson P.C.

(57) ABSTRACT

In some implementations, a mobile device can analyze motion sensor data and proximity sensor data during a voice call to determine whether the mobile device is on a stationary object or worn on a user's body (e.g., in the lap or pocket of a user of the mobile device). The mobile device can adjust the transmit power level of the telephony transceiver during the voice call based on the determination.

27 Claims, 10 Drawing Sheets

(51) Int. Cl.
*H04W 52/28* (2009.01)
*H04W 52/24* (2009.01)
*H04W 52/36* (2009.01)
*H04B 17/27* (2015.01)

(52) U.S. Cl.
CPC .......... H04W 52/285 (2013.01); *H04B 17/27* (2015.01); *H04W 52/367* (2013.01)

(58) Field of Classification Search
CPC ........ H04B 1/401; H04B 17/00; Y02B 60/50; H01Q 1/243
USPC ............................. 455/550.1, 73, 115.1, 566
See application file for complete search history.

(56) References Cited

U.S. PATENT DOCUMENTS

| | | | |
|---|---|---|---|
| 2010/0033422 A1 | 2/2010 | Mucignat et al. | |
| 2011/0250928 A1 | 10/2011 | Schlub et al. | |
| 2013/0110010 A1 | 5/2013 | Fuke et al. | |
| 2013/0122827 A1 | 5/2013 | Ali et al. | |
| 2013/0172045 A1 | 7/2013 | Caballero et al. | |
| 2013/0191908 A1* | 7/2013 | Klein | G06F 21/36 726/18 |
| 2014/0364102 A1 | 12/2014 | Pham et al. | |

FOREIGN PATENT DOCUMENTS

| | | |
|---|---|---|
| KR | 10-2011-0030534 | 3/2011 |
| KR | 10-2013-0010120 | 1/2013 |
| TW | 507460 | 10/2002 |
| WO | 2009/149023 | 12/2009 |

OTHER PUBLICATIONS

Van Der Westhuizen, Marthinus. Australian Office Action Received in Australian Patent Application No. 2014202757. Received Feb. 16, 2015. 3 pages.
Extended European Search Report, dated Jun. 10, 2014, corresponding to European Application No. 14161348.9, 7 pages.
Yi, Ren. Translation of Chinese Office Action from Chinese Patent Application No. 201420275048.9. Received Aug. 12, 2014. 4 pages.
Thanabalasingham, Thayaparan. Australian Office Action Received in Australian Patent Application No. 2014100524. Received Jul. 21, 2014. 5 pages.
Korean Office Action in Application No. 10-2014-63985, dated Apr. 23, 2015, 6 pages. (with English translation).
Australian Office Action in Application No. 2015202940, dated Apr. 27, 2016, 4 pages.
Korean Office Action in Application 10-2015-0075075, dated Apr. 15, 2016, 14 pages.
Chinese Office Action for Application No. 201410226148.7, dated Dec. 21, 2016, 23 pages (With English Translation).
European Office Action for Application No. 14161348.9, dated Nov. 17, 2016, 6 pages.
U.S. Appl. No. 13/913,271, filed Jun. 7, 2013, Determination of Device Body Location, Pham et al.

* cited by examiner

DETERMINATION OF DEVICE BODY LOCATION

CROSS REFERENCE TO RELATED APPLICATIONS

This application is a continuation-in-part of and claims priority to U.S. patent application Ser. No. 13/913,271, filed on Jun. 7, 2013, the entire contents of which are hereby incorporated by reference.

TECHNICAL FIELD

The disclosure generally relates to motion analysis on a mobile device.

BACKGROUND

Mobile devices often include telephony features that allow users to receive and place voice calls over a wireless network. For example, modern smartphones include wireless transceivers that allow the smartphones to receive and place telephone calls over cellular voice and/or data networks (e.g., CDMA, 2G, 3G, 4G LTE, etc.). These wireless transceivers can transmit at different power levels. Transmitting at high power levels can improve the quality of the voice calls. Transmitting at low power levels may be required when the mobile device is worn on or near the user's body to comply with government regulations.

SUMMARY

In some implementations, a mobile device can analyze motion sensor data and proximity sensor data during a voice call to determine whether the mobile device is on a stationary object (e.g., table) or worn on a user's body (e.g., in the lap or pocket of a user of the mobile device). The mobile device can adjust the transmit power level of the telephony transceiver during the voice call based on the determination.

Particular implementations provide at least the following advantages: The user can experience better quality voice calls when the mobile device is on a stationary object (e.g., a table) during voice call because the voice call can be transmitted using a high transmission power level.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Overview

In some implementations, a mobile device can be configured with one or more motion sensors. For example, a motion sensor can be an accelerometer, gyroscope or other type of motion sensor. In some implementations, the mobile device can be configured with telephony components that allow a user to make and receive telephone calls. For example, telephony components can include one or more radio frequency transceivers that are configured to access one or more radio access technologies (e.g., GSM, UMTS, 2G, 3G, LTE, etc.).

In some implementations, the mobile device can be configured to adjust the transmission power of the telephony components when the mobile device connects to a voice call. For example, the mobile device can be configured to adjust the transmission power based on whether the mobile device is on a stationary object (e.g., a table) or worn on the user's body (e.g., on the user's lap, in the user's pocket, etc.).

Figure 1:
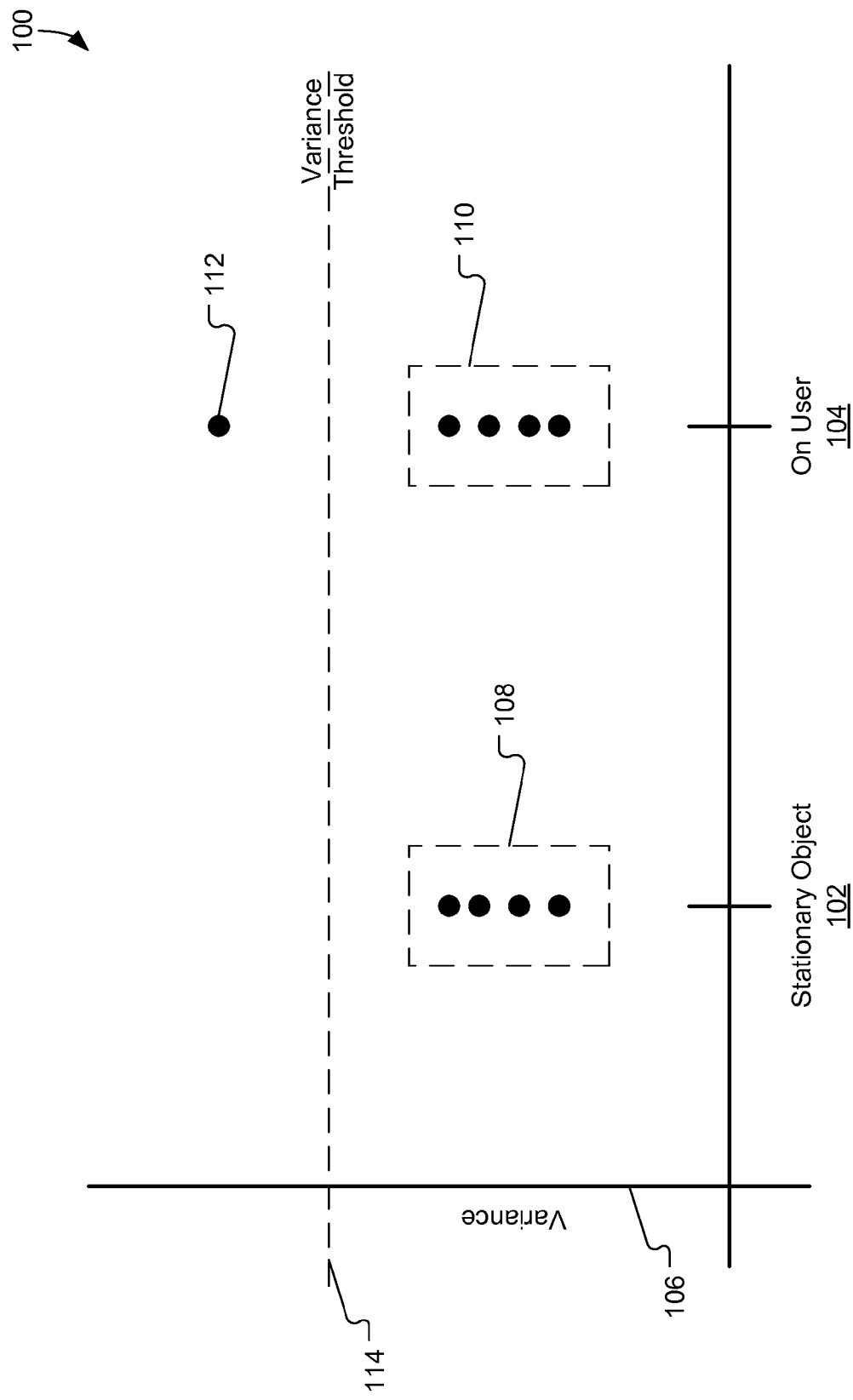
FIG. 1 illustrates an example graph showing motion variance of the mobile device for stationary object and on user positions.

FIG. 1 illustrates an example graph 100 showing motion variance of the mobile device for stationary object 102 and on user positions 104. The vertical axis 106 of graph 100 indicates the amount of variance. In some implementations, the determination of whether the mobile device is on a stationary object or worn by the user can be based on the variance in magnitude (i.e., amplitude) of a motion signal generated by the mobile device's motion sensor. For example, when the mobile device is on a stationary object 102 (e.g., a table), the variance in the motion signal magnitude (i.e., amplitude) will be small, as demonstrated by variance measurements 108. When the mobile device is on the lap or in the pocket of a user, the variance of the motion signal will be similar to that of the motion signal when the mobile device is on a stationary object, as demonstrated by variance measurements 110. However, when the mobile device is worn on the user's body, the user will eventually move and thereby create a magnitude spike in the motion signal that will temporarily increase the variance of the motion signal, as indicated by variance measurement 112. When the mobile device detects that the variance of the motion signal has exceeded a variance threshold 114 (e.g., a predefined, empirically determined threshold), the mobile device can determine that the mobile device is located or positioned on the user's body (e.g., lap, pocket, etc.). If the mobile device does not detect the variance increase within a period of time (e.g., a predefined, empirically determined period of time), then the mobile device can determine that the mobile device is located or positioned on a stationary (e.g., inert, inanimate) object.

Figure 2:
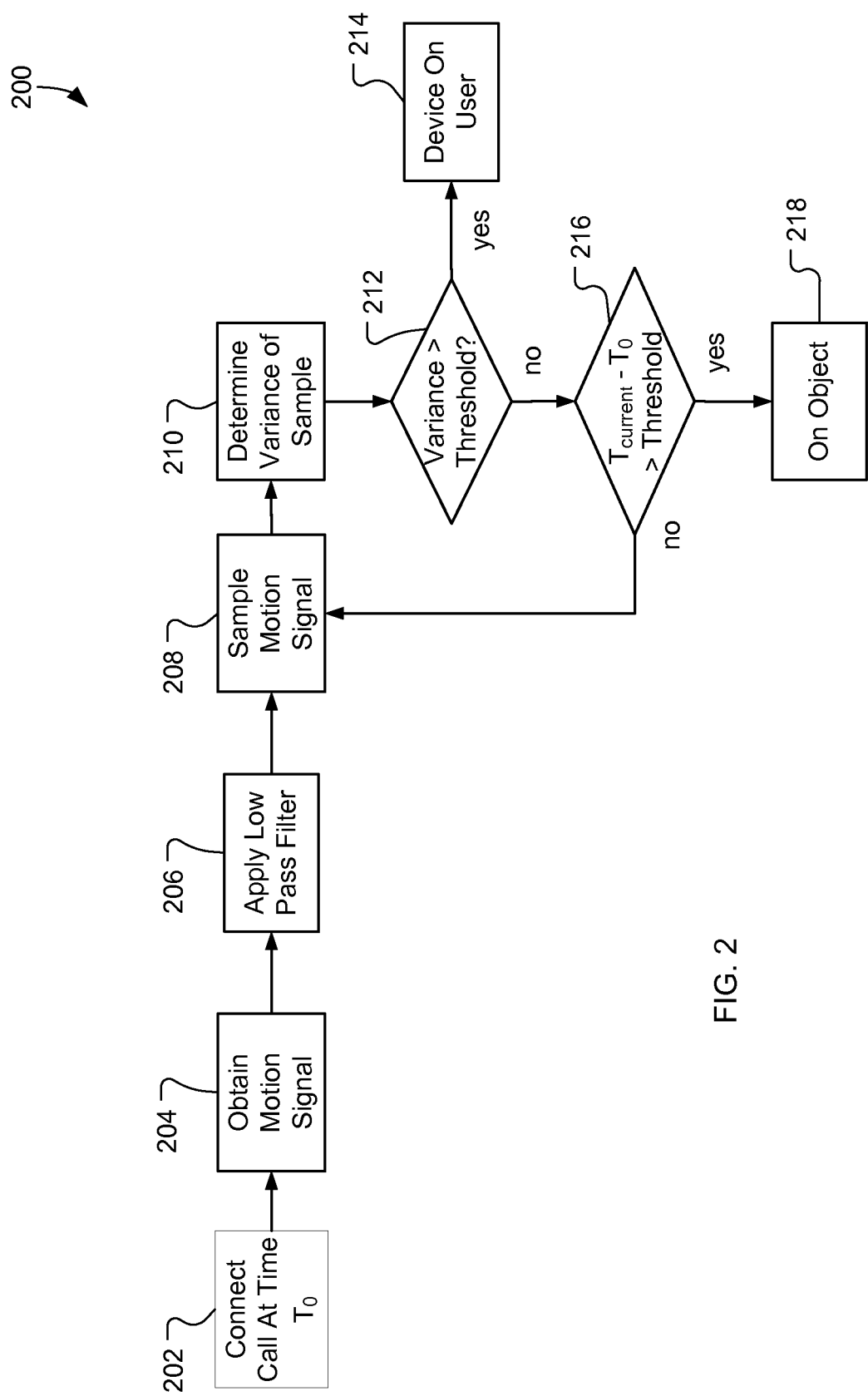
FIG. 2 is a flow diagram of an example process for determining whether the mobile device is on a stationary object or on a user.

FIG. 2 is a flow diagram of an example process 200 for determining whether the mobile device is on a stationary object or on a user. In some implementations, the mobile device can connect to a voice call 202 at a time $T_0$ (e.g., $T_0$ is the time when the call is connected). For example, the mobile device can be configured with telephony features that allow a user to place and receive voice calls. When the mobile device connects to a voice call, the mobile device can obtain motion data (e.g., a motion signal) from a motion sensor of the mobile device 204. For example, the mobile device can generate motion signal that indicates the amount (e.g., magnitude and frequency) of motion over time based on motion data received from the motion sensor. The mobile device can apply a low pass filter 206 to the motion signal to filter out (e.g., attenuate) high frequency motion signals (e.g., noise).

In some implementations, the mobile device can be configured to sample the filtered motion signal 208 for a period of time (i.e., the sample period). For example, the mobile device can be configured to collect samples of the motion signal over the sample period. The mobile device can sample and store into a buffer five (5) seconds of the filtered motion signal, for example. In some implementations, the motion signal samples can be analyzed to determine the variance of the motion signal 210 during the sample period. For example, the motion signal sample can be passed through a variance filter or other variance calculating function that will determine the variance of the motion signal samples.

Once the variance of the motion signal samples is determined, the variance can be compared to a variance threshold value 212 to determine if the variance threshold value has been exceeded by the motion signal samples. For example, if the variance of the motion signal samples is greater than the motion variance threshold, then the mobile device can determine that the mobile device is located or positioned on the user's body 214. If the variance of the motion signal samples is not greater than the motion variance threshold, then the mobile device can compare the amount of time that has passed since the voice call was connected (e.g., $T_{current} - T_0$) to a threshold period of time 216. For example, if the threshold period of time has elapsed since the voice call was connected and the variance of the motion signal (as determined from the motion signal samples) has not exceeded the variance threshold within the threshold period of time, then the mobile device can determine that the mobile device is located on a stationary object 218 and not located on the user.

If the threshold period of time has not elapsed since the call was connected, then the mobile device can collect another set of motion signal samples 208 and determine whether the variance of the motion signal samples 210 exceeds the variance threshold 212. Collecting samples and comparing the variance of the samples to the variance threshold can continue until the threshold period of time has elapsed 216 and the on object location 218 of the mobile device is determined. If the variance of a set of motion signal samples 210 exceeds the variance threshold 212 before the threshold period of time has elapsed, then an on user location 214 location of the mobile device can be determined.

In some implementations, the mobile device can determine that the threshold period of time has elapsed using a counter. For example, if the threshold period of time is one minute and the sample period is ten seconds, then the mobile device can determine that the threshold period of time has elapsed after six motion signal samples have been taken. Thus, in some implementations, each time the mobile device determines whether the threshold period of time has elapsed 216, the mobile device can increment a counter (e.g., starting from zero). Once the counter has reached a number (n) equal to the threshold period of time divided by the sample period (n=threshold period/sample period), then the mobile device can determine that the mobile device is on a stationary object 218, as described above.

In some implementations, when a voice call is connected 202, the mobile device can be configured to adjust the transmit power of the telephony components of the mobile device to a low power level as if it has determined that the mobile device is being worn on the user's body. For example, the mobile device can be configured to default or initialize to the on body location. After the threshold period of time has passed 216, and if the variance of the motion signal never exceeds the threshold variance 212, then the mobile device can determine that the mobile device is located or positioned on a stationary object and can increase the transmit power to a high power level.

Figure 3:
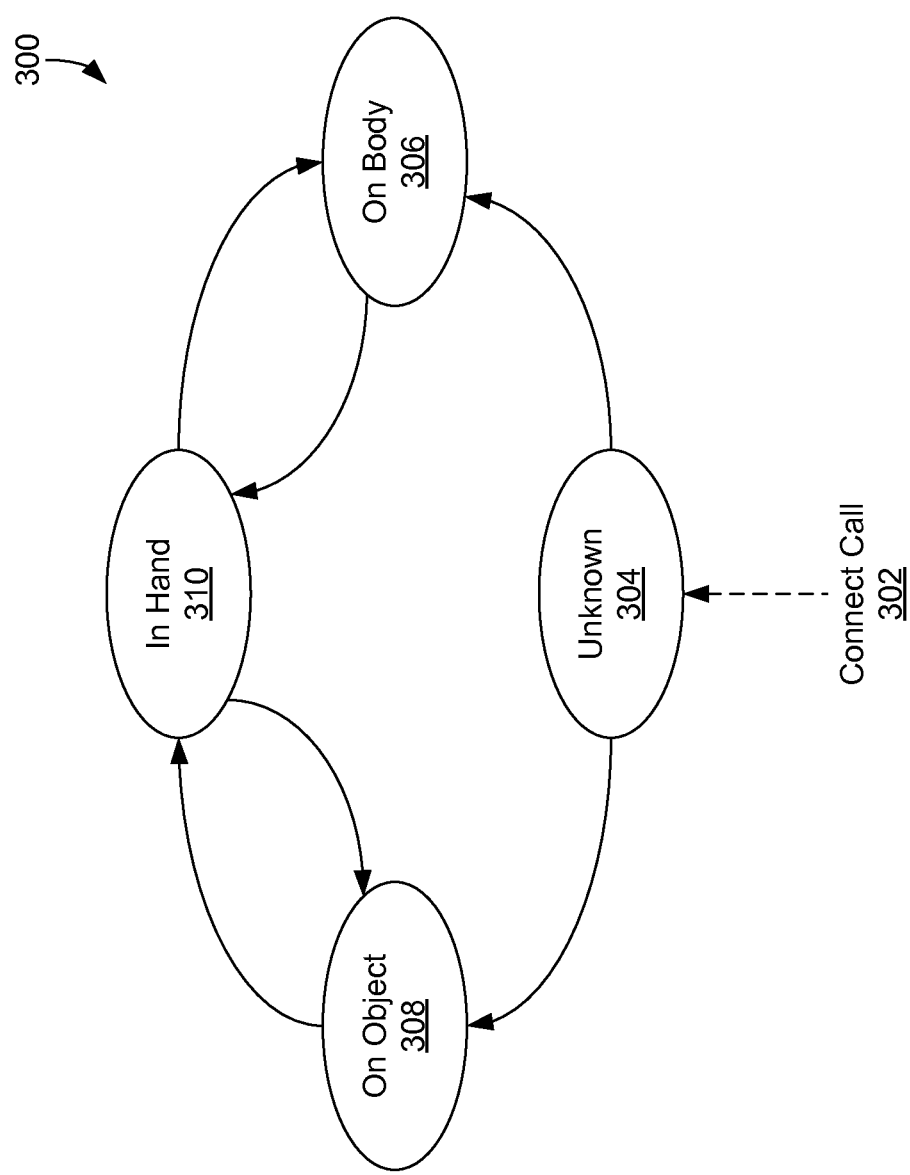
FIG. 3 illustrates an example state machine for determining the whether the mobile device is on a stationary object or on the user's body.

FIG. 3 illustrates an example state machine 300 for determining the whether the mobile device is on a stationary object or on the user's body. For example, state machine 300 can be used to determine where the mobile device is currently positioned (e.g., on a stationary object, on the user's body). The mobile device can use the current state of the state machine 300 to determine whether to adjust the transmit power of the mobile device.

In some implementations, the mobile device can be configured to start in an unknown state 304 when a voice call is connected 302. In some implementations, the mobile device can be configured to start in the on body state 306 when a call is connected 302. Once the call is connected, the mobile device can monitor the movement of the mobile device to determine a stationary object 308 or on body 306 position for the mobile device, as described above with reference to FIG. 2. For example, if an on stationary object location (e.g., on table) is determined, then the state machine 300 can transition from unknown state 304 to on object state 308. If an on body location (e.g., on user's lap, in user's pocket) is determined, then the state machine 300 can transition from unknown state 304 to on body state 306.

In some implementations, the state machine 300 can include an in hand state 310 for transitioning between the on object state 308 and on body state 306. For example, if the mobile device is on an object, such as a table, the user will likely pick up the mobile device before putting the mobile device on the user's body (e.g., in the user's pocket, on the user's lap). If the mobile device is on the user's body, the user will likely pick up the mobile device before putting the mobile device on a stationary object. In either case, the mobile device will be held in the user's hand during the transition from an on body location to an on object location or from an on object location to an on body location.

Similarly, the state machine 300 can be configured with an in hand state 310 for transitioning between on object state 308 and on body state 306. For example, once in the on object state 308 or the on body state 306 the mobile device can continue analyzing motion data (e.g., motion signal) from the mobile device's motion sensor. If the motion data indicates a pattern of motion consistent with the mobile device being picked up or held in hand, the state machine 300 can transition from on object state 308 or on body state 306 to in hand state 310.

In some implementations, when the state machine 300 indicates that the mobile device is in the in hand state 310, the mobile device can perform process 200 to determine whether to transition to on object state 308 or on body state 306. For example, when the state machine 300 is in the in hand state 310, the mobile device can perform steps 204-218 of process 200 to determine whether and when to transition from the in hand state 310 to the on body state 306 or on object state 308.

Figure 4:
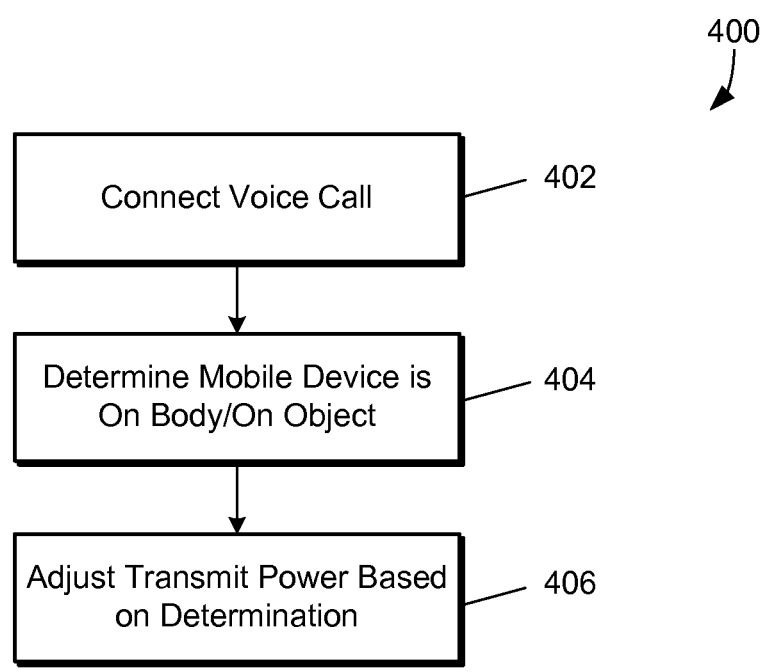
FIG. 4 is flow diagram of an example process for adjusting the transmit power of a mobile device based on a user body location of the mobile device.

FIG. 4 is flow diagram of an example process 400 for adjusting the transmit power of a mobile device based on a user body location of the mobile device. At step 402, the mobile device can connect to a voice call. For example, a user can use the mobile device to initiate or receive voice calls (e.g., telephone call) on the mobile device.

At step 404, the mobile device can determine whether the mobile device is on the user's body or on an object. For example, the mobile device can perform process 200 of FIG. 2 and/or use state machine 300 of FIG. 3 to determine whether the mobile device is located on the user's body (e.g., in pocket, on lap, etc.) or on a stationary object (e.g., table, desk, floor, etc.).

At step 406, the mobile device can adjust the transmit power of the mobile device based on the location or position of the mobile device. For example, if the mobile device is on the user's body, the mobile device can reduce the transmit power of the mobile device to a predetermined low power level. If the mobile device is on a stationary object (e.g., away from the user's body), then the mobile device can increase the transmit power of the mobile device to a predetermined high power level.

In some implementations, the transmit power of a mobile device can be adjusted based on both motion data (e.g., data from a motion sensor describing the movement of a mobile device) and proximity data (e.g., data from a proximity sensor describing the proximity of the mobile device to a detected object). In some cases, by using both motion data and proximity data, the location of the mobile device can be determined with a greater degree of accuracy or confidence.

Proximity data can be collected in a variety of ways. For example, proximity data can be obtained from a proximity sensor, such as a light-emitting diode (LED) and an associated photodetector (e.g., a photodiode). In an example implementation, the light-emitting diode may be an infrared light-emitting diode. Reflected light from nearby objects may be detected using the photodiode. When sufficient reflected light is detected, it can be concluded that a human body part (e.g., a head, finger, or hand) or other object (e.g., a desk, table, or chair) is located close to proximity sensor. When insufficient reflected light is detected, it can be concluded that no objects are located near to the proximity sensor. If desired, emitted light from the proximity sensor may be concentrated at a particular distance from the proximity sensor using a lens or other focusing structure. This may help to enhance the strength of reflected signals from objects located at this particular distance.

In some implementations, the light-emitting diode in the proximity sensor may be modulated at a particular frequency or may be modulated using any other suitable modulation pattern. The use of a modulation pattern to drive the light-emitting diode may help to discriminate reflected light-emitting diode signals from background illumination. This may increase the signal-to-noise ratio of the proximity sensor. If desired, the proximity sensor may be based on proximity detection arrangements other than light-emitting diode arrangements. For example, a proximity sensor for a mobile device may be based on a capacitive sensor, a photodetector that works only with ambient light (and not emitted light from the device device), an acoustic proximity sensor (e.g., a sensor that uses ultrasonic sound waves to determine the presence or absence of a nearby object), a sensor that detects reflected electromagnetic radiation (e.g., radio-frequency radiation), or any other suitable sensor capable of detecting the presence of a nearby object.

In some implementations, an ambient light sensor may be used to detect the level of ambient illumination around the mobile device. An ambient light sensor may be implemented using a photodiode that is sensitive to visible light. Separate photodiodes are can be used for proximity sensors and ambient light sensors, but the photodiode functionality of an ambient light sensor and the photodiode functionality of a proximity sensor (in a light-based proximity detector) may be implemented using a common photodiode if desired. Information on the amount of light that is gathered by an ambient light sensor may be used to adjust the screen brightness of a mobile device's display (as an example).

If desired, proximity sensor functionality may be implemented in the mobile device using a device that serves multiple functions. As an example, a capacitive touch sensor or other such touch sensor that is part of a touch display may be used in detecting the presence of a nearby object. During normal operation, touch sensor output signals may be used to identify user input selections as a user presses a finger against various portions of the mobile device's display. When used as a proximity sensor, the output signals of the touch screen may be processed to determine whether or not an object is adjacent to the mobile device. With this type of arrangement, the capacitive readings obtained from the touch sensor portion of the display may be processed, for example, to determine whether a user has placed the mobile device next to the user's head. Because the presence of the user's head in the vicinity of the screen will change the capacitive reading (or other such touch sensor reading) from the display, the presence of the user's head can be detected without using a conventional proximity sensor. As another example, light readings from an ambient light sensor may be used as an indicator of the proximity of an object to the mobile device (e.g., by detecting shadows that indicate the presence of an object). Touch pads without displays may also be used to produce proximity data.

To improve accuracy, signals from multiple proximity sensor devices (e.g., an LED-based proximity sensor, an ambient light sensor used to detect proximity, a capacitive touch screen, etc.) may be processed in parallel. With this type of arrangement, the mobile device can more accurately determine whether or not device has been placed in close proximity to an object.

In some implementations, one or more proximity sensors can be used to determine the distance of a detected object from the proximity sensor. The proximity sensor can, in some cases, determine the absolute distance of the detected object from the proximity sensor. In some cases, the proximity sensor can determine an approximate or relative distance of the detected object from the proximity sensor. For example, the proximity sensor might determine that a detected object is either "near" the proximity sensor (e.g., when the detected object is within a particular distance from the proximity sensor), within an "intermediate" distance from the proximity sensor (e.g., when the detected object is within a particular larger distance from the proximity sensor), or "far" from the proximity sensor (e.g., when the detected objected is beyond a particular distance from the proximity sensor, or when no object is detected at all).

Although example implementations of proximity sensors are described above, these are merely examples. Other proximity sensors capable of determining proximity information can also be used. As an example, additional proximity sensors are described in U.S. Pat. No. 8,417,296, which is incorporated herein by reference.

Figure 5:
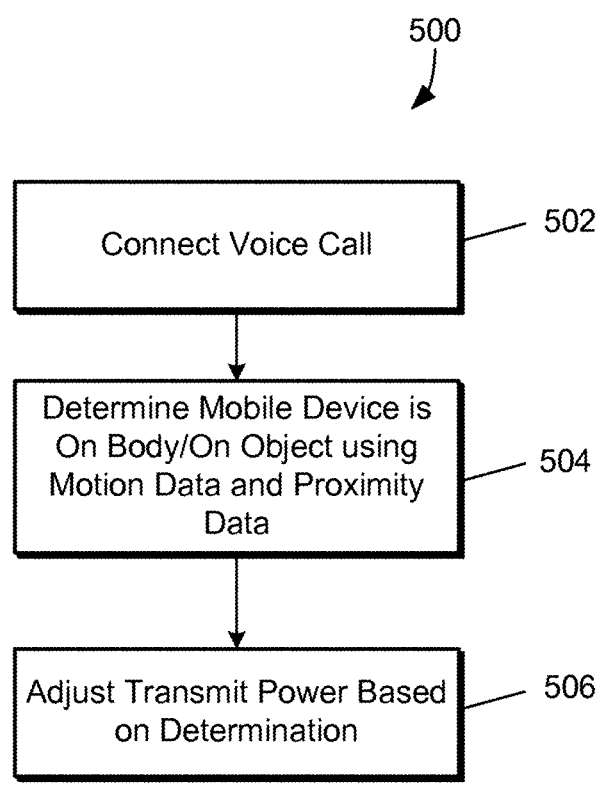
FIG. 5 is a flow diagram of another example process for adjusting the transmit power of a mobile device based on a user body location of the mobile device.

FIG. 5 is a flow diagram of an example process for adjusting the transmit power of a mobile device based on a user body location of the mobile device. At step 502, the mobile device can connect to a voice call. For example, a user can use the mobile device to initiate or receive voice calls (e.g., telephone call) on the mobile device.

At step 504, the mobile device can determine whether the mobile device is on the user's body or on an object using both motion data and proximity data. In some implementations, the mobile device can consider motion data and proximity data individually, such that individual predictions are made using each of the different types of data. For instance, in some cases, a first prediction can be made using solely the motion data, while a second prediction can be made using solely the proximity data.

Predictions can be made using motion data in a manner similar to that described above. For example, using the motion data, the mobile device can perform process 200 of FIG. 2 and/or use state machine 300 of FIG. 3 to predict whether the mobile device is located on the user's body (e.g., in a pocket, on lap, etc.) or on a stationary object (e.g., table, desk, floor, etc.). In some implementations, this prediction might be a determination regarding the "motion state" of the mobile device. For example, the mobile device can determine if it is in an "on-object" motion state (e.g., corresponding to state 308 of FIG. 3), an "on-body" motion state (e.g., corresponding to state 306 of FIG. 3), or an "in-hand" motion state (e.g., corresponding to state 310 of FIG. 3). The mobile device can, for instance, determine it is in an on-object motion state upon predicting that the mobile device is on an inanimate object.

Predictions can be made using proximity data in a variety of ways. For example, in some implementations, a prediction might be a determination regarding the "proximity state" of the mobile device. This determination can be based, at least in part, on proximity data from a proximity sensor. For example, the mobile device can determine that it is in a "near" proximity state when it determines that the mobile device is within a particular distance from a detected object. As another example, the mobile device can determine that it is in an "intermediate proximity state" when it determines that the mobile device is within a particular further distance from the detected object. As another example, the mobile device can determine it is in a "far" proximity state when it determines that the mobile device is even farther from the detected object. Different states can, for example, be defined by particular ranges of distances. For example, the near proximity state can correspond to situations when the mobile device is within a first distance from a detected object. As another example, the intermediate proximity state can correspond to situations when the mobile device is between a second distance and the first distance from the detected object, where the second distance is greater than the first. As another example, the far proximity state can correspond to situations when the mobile device is further than the second distance away from the detected object. While different example states are described above, these are provided only to illustrate how different proximity states can be defined. Different proximity states and different numbers of proximity states can be used, depending on the implementation.

Predictions based on motion data and predictions based on proximity data can be interpreted in conjunction in order to determine if the mobile device is on body (e.g., on a user's body) or on object (e.g., on an inanimate object). For example, in some implementations, some combinations of motion states and proximity states can correspond to a determination that the mobile device is on body, while other combinations of motion states and proximity states can correspond to a determination that the mobile device is on object. As an example, if the mobile device is in an "on-body" motion state and a "near" proximity state," the mobile device might determine that it is on body. As another example, if the mobile device is in an "on-object" motion state and a "far" proximity state," the mobile device might determine that is on object. These example combinations are provided to demonstrate how combinations of different motion states and proximity states can be used to determine if the mobile device is on body or on object. In practice, other combinations of states and corresponding determinations can be implemented, either in addition to or instead of those described above.

Motion data and proximity data need not be collected concurrently at all times. For example, in some implementations, the mobile device can make a determination regarding whether it is on body or on object using only motion data (e.g., as shown in FIG. 2). At some point in the future (e.g., after proximity data is made available at a later time), the mobile device can incorporate proximity data in its determination (e.g., as shown in FIG. 3).

In some implementations, the length of time required to collect sufficient motion data to make a motion state prediction might differ from the length of time required to collect sufficient proximity data to make a proximity state prediction. As an example, in some implementations, a motion sensor might need to collect data for several seconds in order determine a motion state, while a proximity sensor might only need to collect data for less than a second in order to determine a proximity state. In these implementations, the mobile device might make a determination regarding whether it is on body or on object using data from only one sensor (e.g., using only proximity data), until sufficient data has been acquired from the other sensor. In this manner, the mobile device can make a determination as soon as it receives sufficient measurement data from at least one of the sensors, and can update its determination upon receipt of additional measurement data from other sensors.

At step 506, the mobile device can adjust the transmit power of the mobile device based on the location or position of the mobile device. For example, if the mobile device is on the user's body (e.g., as determined using motion data and proximity data, as described above) the mobile device can reduce the transmit power of the mobile device to a predetermined low power level. If the mobile device is on a stationary object (e.g., away from the user's body), then the mobile device can increase the transmit power of the mobile device to a predetermined high power level.

In the examples above, the motion state of a mobile device can be determined based on the variance of a motion signal (e.g., as shown in FIGS. 1 and 2). Other techniques can also be used to determine the motion state of a mobile device. For example, in some implementations, motion data can include information that describes the acceleration experienced by a mobile device over a period of time (e.g., an acceleration signal). For instance, the acceleration signal might include a series of values, where each value describes the acceleration experienced by the mobile device at a particular moment in time. When placed into a sequence, these values can be represented as a time-dependent waveform that describes the acceleration experienced by the mobile device during the given span of time. This acceleration signal can be obtained, for example, using an accelerometer that obtains acceleration measurements periodically over a particular span of time (e.g., over the span of one second, two seconds, three seconds, or some other span of time).

Different portions of the acceleration signal can be considered in order to determine the motion state of the mobile device. For instance, in some implementations, the power of the acceleration signal within two or more different frequency bands can be compared in order to classify the motion state of the mobile device. As an example, an acceleration signal can be interpreted based on its low frequency power and its high frequency power. Low frequency power and high frequency power can be determined, for example, by calculating the signal's power of within a particular frequency band. As an example, a low frequency band can correspond to the band of frequencies between 0 and 10 Hz, and the high frequency band can correspond to the band of frequencies between 10 and 50 Hz. These values are provided only as examples, and in practice, each frequency band can vary, depending on the application.

Given an acceleration signal having particular low frequency and high frequency components, the mobile device can determine the motion state of the mobile device. For example, in some implementations, a ratio can be calculated between an acceleration signal's high frequency power and low frequency power. If the ratio exceeds a particular threshold ratio value, the mobile device might predict that it is in a particular motion state (e.g., the on-object motion state). If the ratio does not exceed that threshold ratio value, the mobile device might predict that it is in another motion state (e.g., the on-body motion state). In this manner, the mobile device predicts whether it is on body or on object based not only on the overall power of the acceleration signal, but also on the power contained within particular frequency bands of the acceleration signal in relation that of other frequency bands of the acceleration signal.

In some implementations, the threshold ratio value can depend on the power of one or more of the frequency bands. As an example, in some implementations, the threshold ratio value might increase as the power of one of the frequency bands increases. As another example, in some implementations, the threshold ratio might increase as the power of one of the frequency bands decreases. In some implementations, the relationship between the power of one or more of the frequency bands and the threshold ratio value can be described in as a mathematical function. In this manner, the threshold ratio value need not remain the same in any particular implementation.

Figure 6:
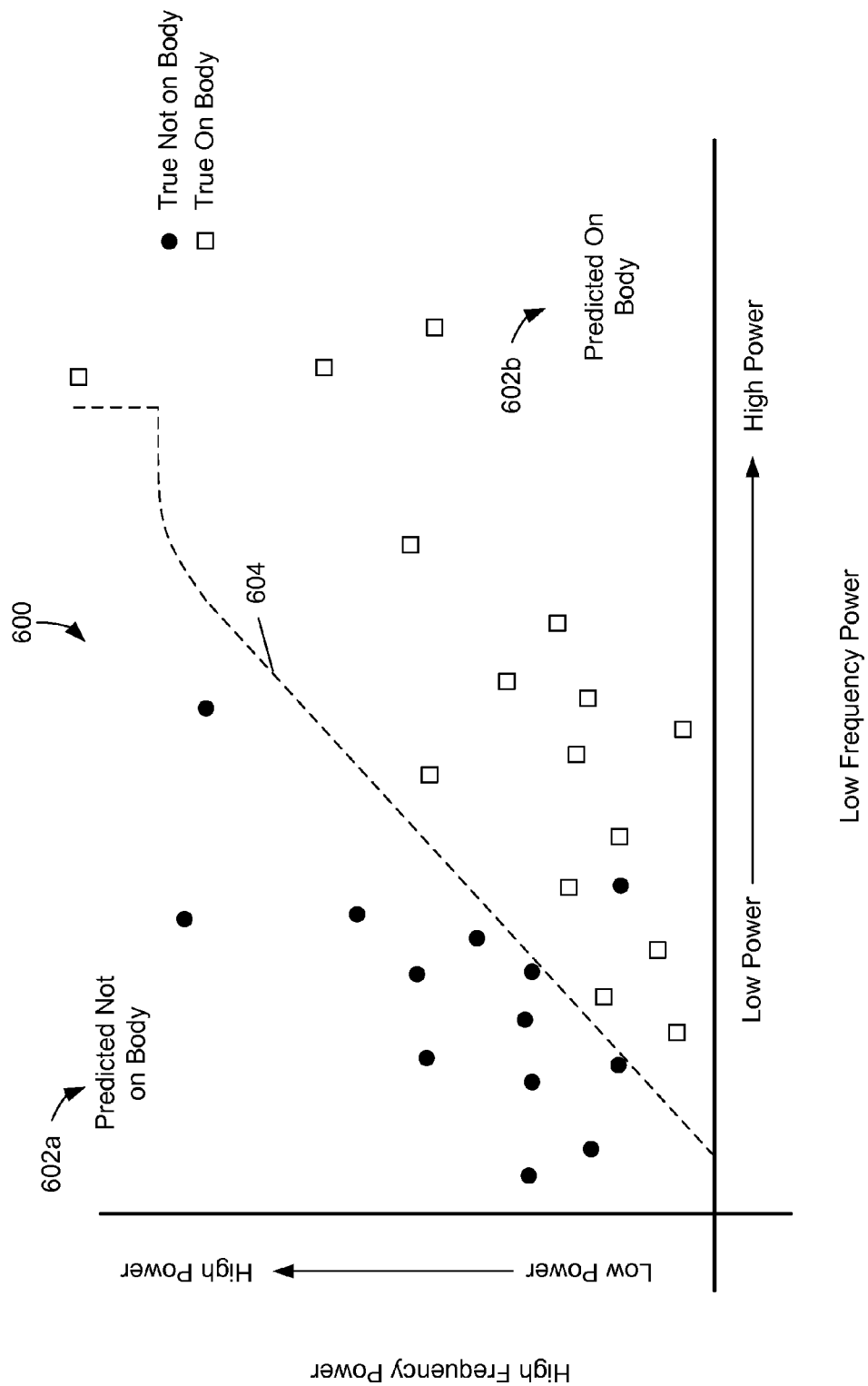
FIG. 6 is a scatter plot for classifying acceleration signals.

In some implementations, the high frequency power and low frequency power of an acceleration signal can be represented as a point on a scatter plot. Depending on where the acceleration signal lies on the scatter plot, a determination can be made regarding the motion state of the mobile device. For example, as shown in FIG. 6, a scatter plot 600 is divided into two regions 602a-b, separated by a line 604. When an acceleration signal falls within region 602a, the mobile device predicts that it is in not on a user's body (e.g., in an on-object motion state). When the acceleration signal falls within region 604b, the mobile device predicts that it is on a user's body (e.g., in an on-body motion state). The path of line 604 through scatter plot 600 can be determined in various ways. For example, as shown in FIG. 6, a series of acceleration measurements can be obtained corresponding to mobile devices known not to be on a user's body (e.g., points 606a), and a series of acceleration measurements can be obtained corresponding to mobile devices known to be on a user's body (e.g., points 602b). Based on these known observations, line 604 can be drawn to divide, either completely or partially, these points into two different regions. The path of line 604 can be determined empirically, for example, based on several experimental measurements obtained when a mobile device was known to be on a user's body and when a mobile not to be on a user's body. In some implementations, line 604 need not be a straight line. For example, portions of line 604 can be straight (e.g., horizontal, vertical, or diagonal) or curved, depending on the implementation.

While an example scatter plot 600 and line 604 is shown in FIG. 6, this is only an example. A scatter plot can be divided into different regions, depending on the application. Further, while the above examples describe the use of two different frequency bands in order to interpret an acceleration signal, in some implementations, three or more different frequency bands can be used. For example, in some implementations, a mobile device may consider a low frequency band (e.g., frequencies from 0-10 Hz), an intermediate frequency band (e.g., frequencies from 10-20 Hz), and a high frequency band (e.g., frequencies from 20-60 Hz). In these implementations, instead of representing the acceleration signals as a two-dimensional scatter plot, the acceleration signals can instead be represented in a three-dimension scatter plot. Likewise, in these implementations, line 604 may instead be a two dimensional surface instead of a line. In a similar manner, more frequency bands can be considered (e.g., four, five, six, or more), depending on the implementation.

Further, while two regions are shown in scatter plot 600 of FIG. 6, in some implementations, there can be a greater number of regions (e.g., three, four, five, and so forth), corresponding to additional motion states. These motion states can, for example, represent the acceleration experienced by a mobile device when it is in a car, when it is in an airplane, when it is on a train, or in any other environment. Accordingly, additional lines can be defined to divide a scatter plot into the desired number of regions.

Considering different portions of the acceleration signal (e.g., the high frequency components and the low frequency components) can provide certain benefits. In some circumstances, certain types of motion contain comparatively higher energy in certain frequency band relative to certain other frequency bands. In some implementations, by considering the distribution of energy between various frequency bands, different types of motion can be differentiated with a greater degree of accuracy. For example, in some cases, a mobile device on a user's body might be expected to have generally greater energy in lower frequency bands relative to higher frequency bands, while a mobile device being operated on an inanimate object might be expected to generally have greater energy in higher frequency bands relative to lower frequency bands (e.g., corresponding to the mobile device striking a firm surface). By determining the amount of energy contained with different frequency bands, a mobile device can thus determine its location with a greater degree of accuracy.

Figure 7:
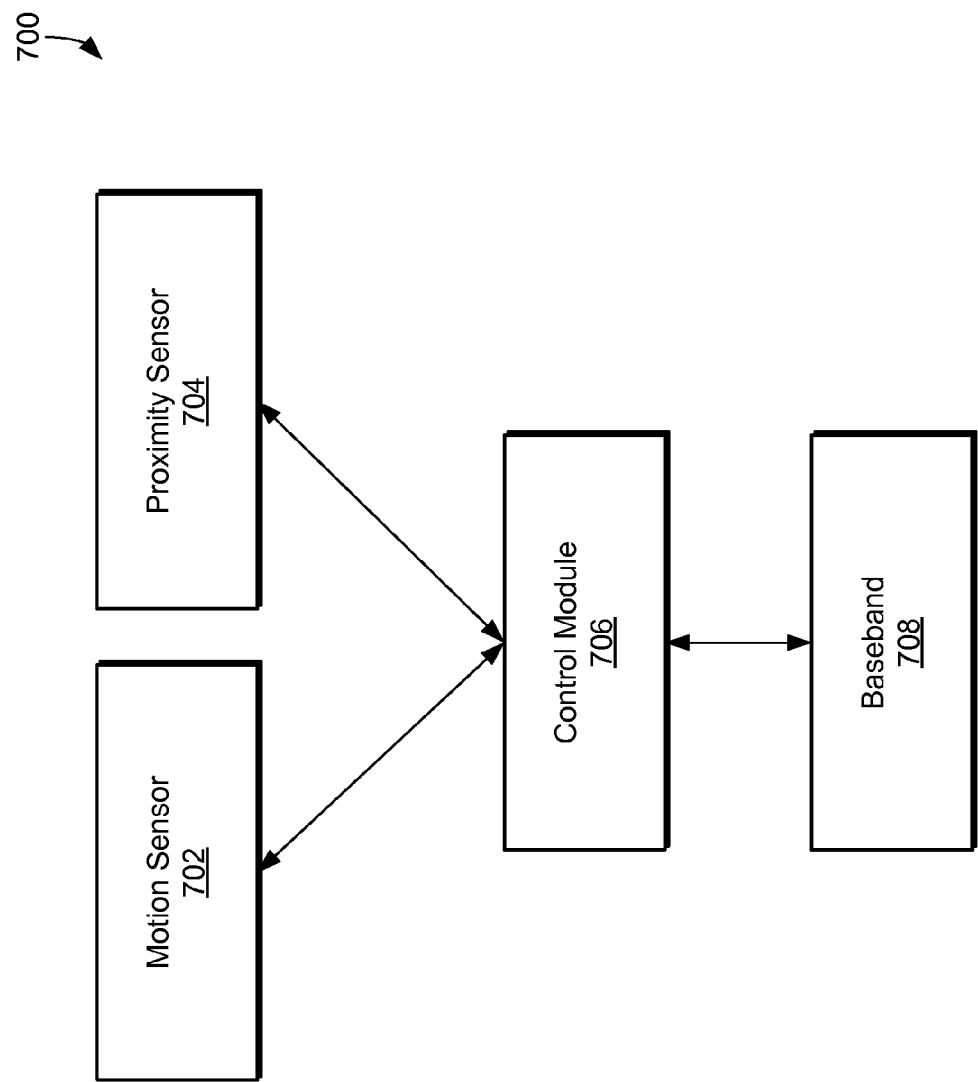
FIG. 7 is a block diagram of an example system for adjusting the transmit power of a mobile device.

An example system 700 is shown in FIG. 7. System 700 can be, for example, included as a part of a mobile device. System 700 includes a motion sensor 702 and a proximity sensor 704 in communication with a control module 706. During operation, the motion sensor 702 obtains motion data, either continuously, periodically, or intermittently (e.g., in response to an instruction by the control module 706), and transmits the motion data to control module 706. Motion sensor 702 can be implemented, for example, using one or more of the motion sensors described above. In a similar manner, during operation, the proximity sensor 704 obtains proximity data, either continuously, periodically, or intermittently, and transmits the proximity data to the control module 706. Proximity sensor 704 can be implemented, for example, using one or more of the proximity sensors described above.

Based on the motion data and/or sensor data obtained from motion sensor 702 and proximity sensor 704, the control module 706 adjusts the transmit power of the mobile device. For example, the control module 706 can use implementations of process 400 and/or implementations of process 500 to determine if the mobile device is on body or on object. In response, the control module 706 can adjust the transmit power of the mobile device, for example by sending instructions to baseband module 708 (e.g., a processor or other component that manages the operation of a data transmission module). In response to these instructions, the baseband module 708 adjusts the transmit power of the mobile device accordingly.

Application Programming Interfaces

One or more Application Programming Interfaces (APIs) may be used in implementations described herein. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some implementations, the API-implementing component may provide more than one API, that provide access to different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other implementations, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (e.g., the API-implementing component and the API-calling component may be the same or different type of module from each other). API-implementing components may in some cases be embodied at least in part in firmware, microcode, or other hardware logic.

In some implementations, an API may allow a client program to use the services provided by a Software Development Kit (SDK) library. In other embodiments an application or other client program may use an API provided by an Application Framework. In these implementations, the application or client program may incorporate calls to functions or methods provided by the SDK and/or provided by the API or use data types or objects defined in the SDK and provided by the API. An Application Framework may in these implementations provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (e.g., on the same data processing system as the API-implementing component) or a remote component (e.g., on a different data processing system from the API-implementing component) that communicates with the API-implementing component through the API over a network. An API-implementing component may also act as an API-calling component (e.g., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component, thus the API may include features for translating calls and returns between the API-implementing component and the API-calling component. However the API may be implemented in terms of a specific programming language. An API-calling component can, in one embedment, call APIs from different providers such as a set of APIs from an OS provider and another set of APIs from a plug-in provider and another set of APIs from another provider (e.g., the provider of a software library) or creator of the another set of APIs.

Figure 8:
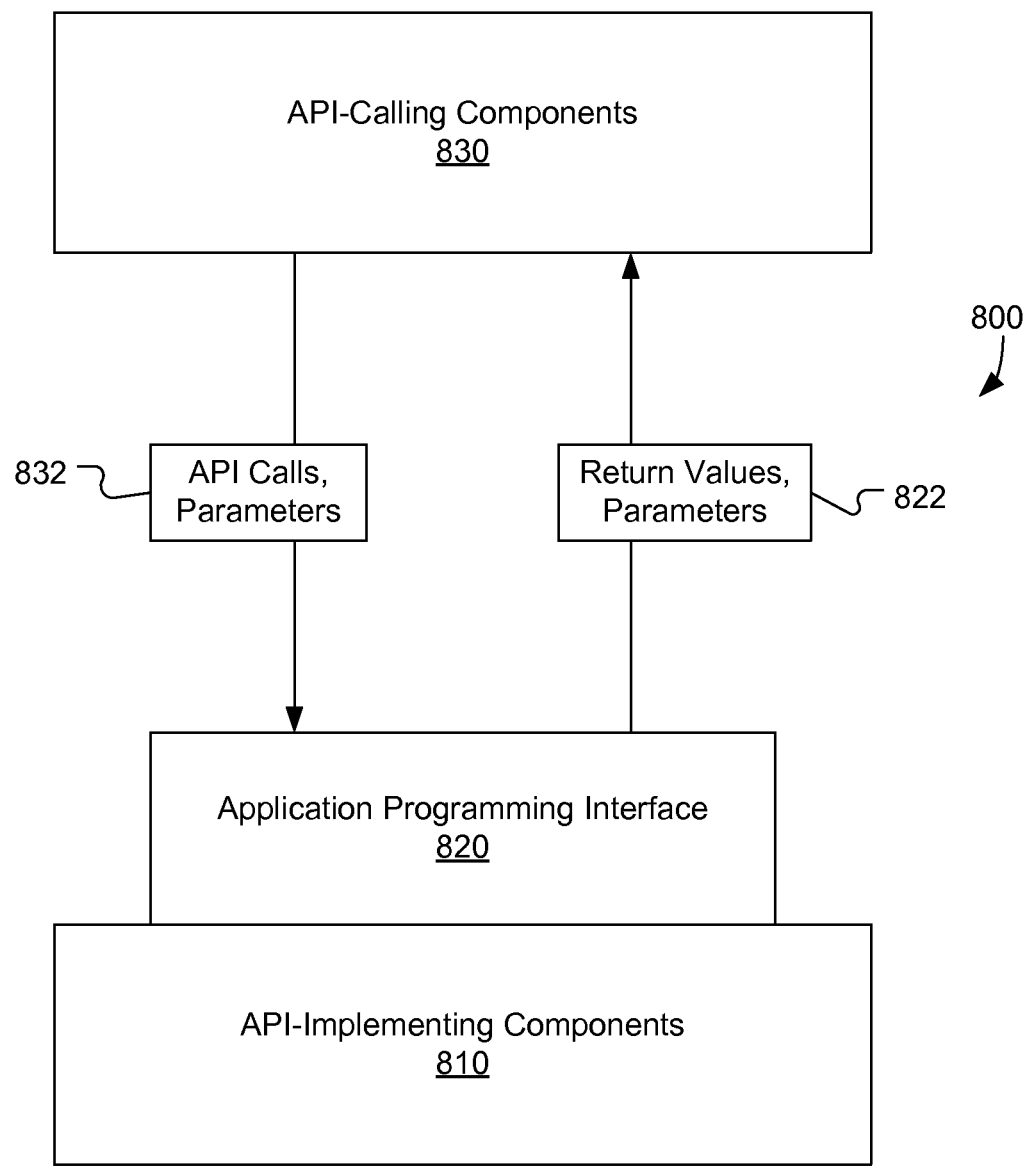
FIG. 8 is a block diagram illustrating an example API architecture, which can be used in some implementations.

FIG. 8 is a block diagram illustrating an example API architecture 800, which can be used in some implementations. As shown in FIG. 8, the API architecture 800 includes the API-implementing component 810 (e.g., an operating system, a library, a device driver, an API, an application program, software or other module) that implements the API 820. The API 820 can specify one or more functions, methods, classes, objects, protocols, data structures, formats and/or other features of the API-implementing component that may be used by the API-calling component 830. The API 820 can specify at least one calling convention that specifies how a function in the API-implementing component receives parameters 832 from the API-calling component and how the function returns a result 822 to the API-calling component. The API-calling component 830 (e.g., an operating system, a library, a device driver, an API, an application program, software or other module), makes API calls through the API 820 to access and use the features of the API-implementing component 810 that are specified by the API 820. The API-implementing component 810 may return a value through the API 820 to the API-calling component 830 in response to an API call.

For example, the API-implementing component 810 can include additional functions, methods, classes, data structures, and/or other features that are not specified through the API 820 and are not available to the API-calling component 830. The API-calling component 830 may be on the same system as the API-implementing component 810 or may be located remotely and accesses the API-implementing component 810 using the API 520 over a network. While FIG. 5 illustrates a single API-calling component 830 interacting with the API 820, other API-calling components, which may be written in different languages (or the same language) than the API-calling component 830, may use the API 820.

The API-implementing component 810, the API 820, and the API-calling component 830 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 9:
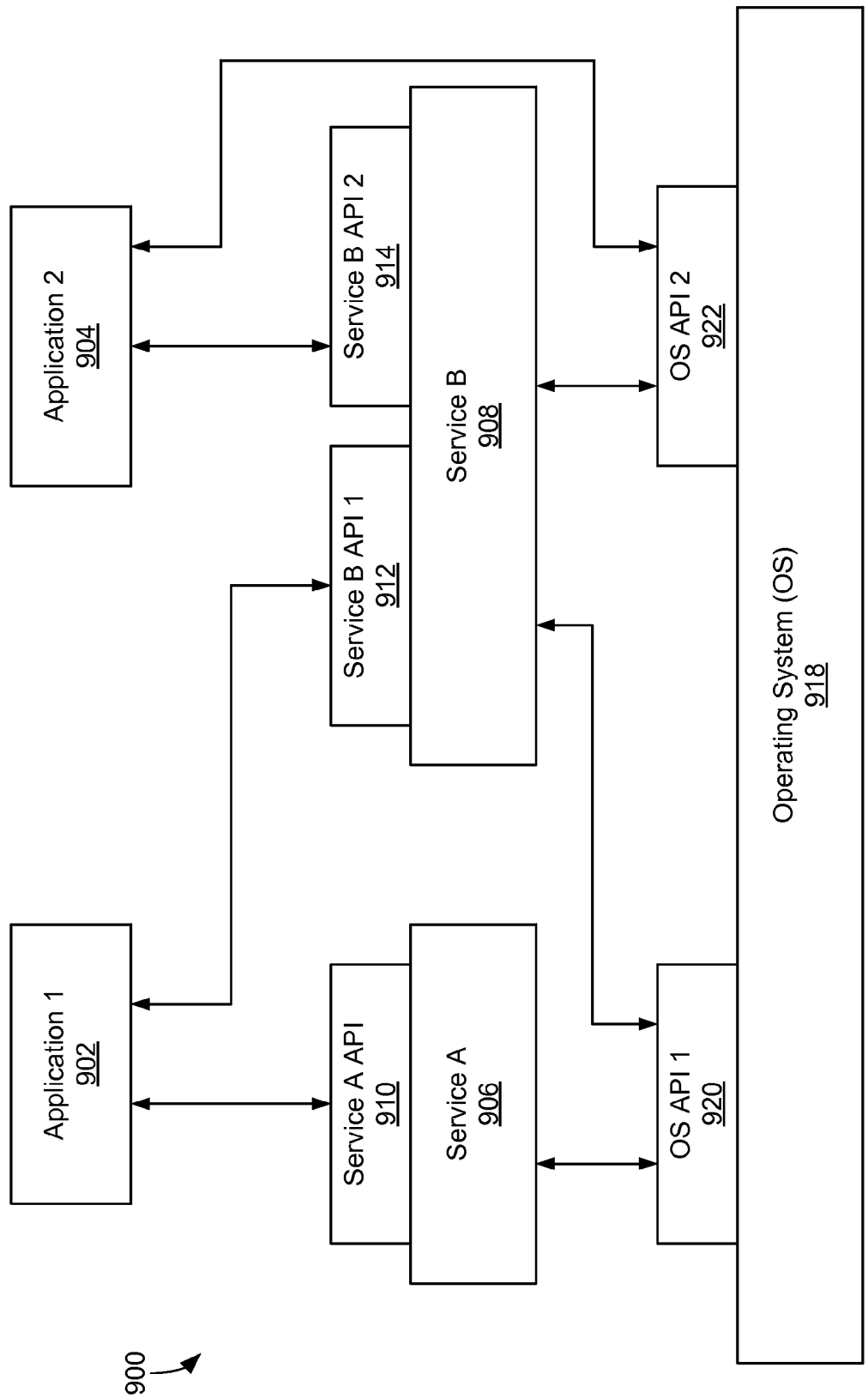
FIG. 9 illustrates an example software stack that includes various application programming interfaces.

FIG. 9 illustrates an example software stack 900 that includes various application programming interfaces. As illustrated by FIG. 9, applications 902 and 904 can make calls to Service A 906 or Service B 908 using several Service APIs 910-916 and to Operating System (OS) 918 using several OS APIs 920-922. Service A 906 or Service B 908 can make calls to OS using several OS APIs 920-922.

Note that the Service B 908 has two APIs 912 and 914, one of which, Service B API 1 912, receives calls from and returns values to Application 1 902 and the other, Service B API 2 914, receives calls from and returns values to Application 2 904. Service A 906 (which can be, for example, a software library) makes calls to and receives returned values from OS API 1 920, and Service B 922 (which can be, for example, a software library) makes calls to and receives returned values from both OS API 1 920 and OS API 2 922. Application 2 904 makes calls to and receives returned values from OS API 2 922.

Example System Architecture

Figure 10:
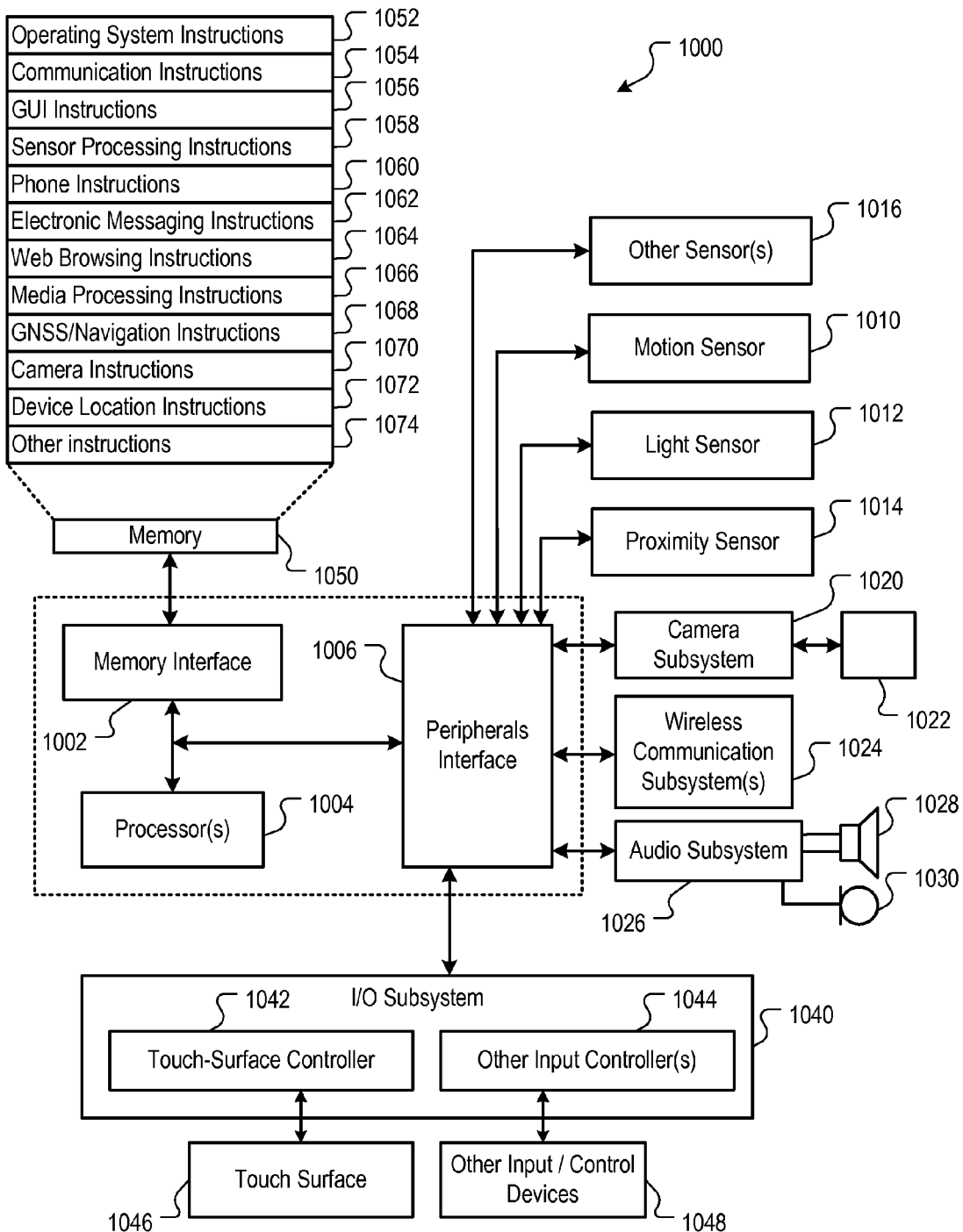
FIG. 10 is a block diagram of an example computing device that can implement the features and processes of FIGS. 1-9.

FIG. 10 is a block diagram of an example computing device 1000 that can implement the features and processes of FIGS. 1-9. As an example, computing device 1000 can be used to implement system 700 of FIG. 7, and perform implementations of process 400 of FIG. 4 and process 500 of FIG. 5. The computing device 1000 can include a memory interface 1002, one or more data processors, image processors and/or central processing units 1004, and a peripherals interface 1006. The memory interface 1002, the one or more processors 1004 and/or the peripherals interface 1006 can be separate components or can be integrated in one or more integrated circuits. The various components in the computing device 1000 can be coupled by one or more communication buses or signal lines.

Sensors, devices, and subsystems can be coupled to the peripherals interface 1006 to facilitate multiple functionalities. For example, a motion sensor 1010, a light sensor 1012, and a proximity sensor 1014 can be coupled to the peripherals interface 1006 to facilitate orientation, lighting, and proximity functions. Other sensors 1016 can also be connected to the peripherals interface 1006, such as a global navigation satellite system (GNSS) (e.g., GPS receiver), a temperature sensor, a biometric sensor, magnetometer or other sensing device, to facilitate related functionalities.

A camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips. The camera subsystem 1020 and the optical sensor 1022 can be used to collect images of a user to be used during authentication of a user, e.g., by performing facial recognition analysis.

Communication functions can be facilitated through one or more wireless communication subsystems 1024, which can include radio frequency receivers and transmitters and/or optical (e.g., infrared) receivers and transmitters. The specific design and implementation of the communication subsystem 1024 can depend on the communication network(s) over which the computing device 1000 is intended to operate. For example, the computing device 1000 can include communication subsystems 1024 designed to operate over a GSM network, a GPRS network, an EDGE network, a Wi-Fi or WiMax network, and a Bluetooth™ network. In particular, the wireless communication subsystems 1024 can include hosting protocols such that the device 1000 can be configured as a base station for other wireless devices.

An audio subsystem 1026 can be coupled to a speaker 1028 and a microphone 1030 to facilitate voice-enabled functions, such as speaker recognition, voice replication, digital recording, and telephony functions. The audio subsystem 1026 can be configured to facilitate processing voice commands, voiceprinting and voice authentication, for example.

The I/O subsystem 1040 can include a touch-surface controller 1042 and/or other input controller(s) 1044. The touch-surface controller 1042 can be coupled to a touch surface 1046. The touch surface 1046 and touch-surface controller 1042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1046.

The other input controller(s) 1044 can be coupled to other input/control devices 1048, such as one or more buttons, rocker switches, thumb-wheel, infrared port, USB port, and/or a pointer device such as a stylus. The one or more buttons (not shown) can include an up/down button for volume control of the speaker 1028 and/or the microphone 1030.

In one implementation, a pressing of the button for a first duration can disengage a lock of the touch surface 1046; and a pressing of the button for a second duration that is longer than the first duration can turn power to the computing device 1000 on or off. Pressing the button for a third duration can activate a voice control, or voice command, module that enables the user to speak commands into the microphone 1030 to cause the device to execute the spoken command. The user can customize a functionality of one or more of the buttons. The touch surface 1046 can, for example, also be used to implement virtual or soft buttons and/or a keyboard.

In some implementations, the computing device 1000 can present recorded audio and/or video files, such as MP3, AAC, and MPEG files. In some implementations, the computing device 1000 can include the functionality of an MP3 player, such as an iPod™. The computing device 1000 can, therefore, include a 36-pin connector that is compatible with the iPod. Other input/output and control devices can also be used.

The memory interface 1002 can be coupled to memory 1050. The memory 1050 can include high-speed random access memory and/or non-volatile memory, such as one or more magnetic disk storage devices, one or more optical storage devices, and/or flash memory (e.g., NAND, NOR). The memory 1050 can store an operating system 1052, such as Darwin, RTXC, LINUX, UNIX, OS X, WINDOWS, or an embedded operating system such as VxWorks.

The operating system 1052 can include instructions for handling basic system services and for performing hardware dependent tasks. In some implementations, the operating system 1052 can be a kernel (e.g., UNIX kernel). In some implementations, the operating system 1052 can include instructions for determining whether the mobile device is on a user's body or on a stationary object and adjusting the transmit power of the mobile device accordingly. For example, operating system 1052 can implement the mobile device locating and transmission power adjustment features as described with reference to FIGS. 1-9.

The memory 1050 can also store communication instructions 1054 to facilitate communicating with one or more additional devices, one or more computers and/or one or more servers. The memory 1050 can include graphical user interface instructions 1056 to facilitate graphic user interface processing; sensor processing instructions 1058 to facilitate sensor-related processing and functions; phone instructions 1060 to facilitate phone-related processes and functions; electronic messaging instructions 1062 to facilitate electronic-messaging related processes and functions; web browsing instructions 1064 to facilitate web browsing-related processes and functions; media processing instructions 1066 to facilitate media processing-related processes and functions; GNSS/Navigation instructions 1068 to facilitate GNSS and navigation-related processes and instructions; and/or camera instructions 1070 to facilitate camera-related processes and functions. The memory 1050 can store software instructions 1072 to facilitate other processes and functions, such as the mobile device locating and transmission power adjustment processes and functions as described with reference to FIGS. 1-9.

The memory 1050 can also store other software instructions 1074, such as web video instructions to facilitate web video-related processes and functions; and/or web shopping instructions to facilitate web shopping-related processes and functions. In some implementations, the media processing instructions 1066 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1050 can include additional instructions or fewer instructions. Furthermore, various functions of the computing device 1000 can be implemented in hardware and/or in software, including in one or more signal processing and/or application specific integrated circuits.

What is claimed is:

1. A method comprising:

connecting, by a mobile device, a voice call for a user of the mobile device, wherein connecting the voice call causes one or more radio frequency transmitters of the mobile device to transmit radio waves at a transmit power level;

obtaining motion data describing movement of the mobile device, wherein the motion data comprises an acceleration signal corresponding to an acceleration of the mobile device over a period of time;

obtaining proximity data describing a proximity of the mobile device to a detected object;

distinguishing between the mobile device being on the user's body or the mobile device being on an inanimate object based on the motion data and the proximity data, wherein distinguishing between the mobile device being on the user's body or the mobile device being on an inanimate object comprises:

determining a motion state of the mobile device based on the motion data, wherein determining the motion state based on the motion data comprises:

calculating a first power of the acceleration signal within a first frequency band;

calculating a second power of the acceleration signal within a second frequency band, wherein the second frequency band is higher than the first frequency band; and determining the motion state of the mobile device based on the first power and the second power;

determining a proximity state of the mobile device based on the proximity data; and distinguishing between the mobile device being on the user's body or the mobile device being on an inanimate object based on the determined motion state and the determined proximity state; and adjusting the transmit power level based on distinguishing between the mobile device being on the user's body or the mobile device being on an inanimate object.

2. The method of claim 1, wherein determining the motion state of the mobile device based on the motion data further comprises:

predicting whether the mobile device is on the user's body or on an inanimate object based on the motion data and not the proximity data;

determining that the mobile device is in an on-object motion state upon predicting that the mobile device is on an inanimate object; and determining that the mobile device is in an on-body motion state upon predicting that the mobile device is on the user's body.

3. The method of claim 2, wherein determining the proximity state of the mobile device based on the proximity data comprises:

determining a distance between the mobile device and the detected object using the proximity data and not the motion data;

determining that the mobile device is in a near proximity state when the mobile device is within a first distance from the detected object;

determining that the mobile device is in an intermediate proximity state when the mobile device is between a second distance and the first distance from the detected object, where the second distance is greater than the first distance; and determining that the mobile device is in a far proximity state when the mobile device is further than the second distance away from the detected object.

4. The method of claim 3, wherein distinguishing between the mobile device being on the user's body or the mobile device being on an inanimate object based on the determined motion state and the determined proximity state comprises:

determining that the mobile device is on the user's body when the mobile is device is in an on-body motion state and the near proximity state.

5. The method of claim 1, wherein determining the motion state of the mobile device based on the first power and the second power comprises:

calculating a ratio between the second power and the first power;

comparing the ratio to a threshold ratio value;

determining that the mobile device is in an on-object motion state when the ratio is greater than the threshold value.

6. The method of claim 5, wherein the threshold ratio value is dependent on at least the first power or the second power.

7. The method of claim 1, wherein determining the motion state of the mobile device based on the motion data further comprises:

calculating a third power of the acceleration signal within a third frequency band, wherein the third frequency band is different than the first frequency band and the second frequency band; and determining the motion state of the mobile device based further on the third power.

8. The method of claim 1, wherein adjusting the transmit power level comprises:

determining that the mobile device is on the user's body; and responsive to determining that the mobile device is on the user's body, reducing the transmit power level.

9. The method of claim 1, wherein adjusting the transmit power level comprises:

determining that the mobile device is on an inanimate object; and responsive to determining that the mobile device is on an inanimate object, increasing the transmit power level.

10. A non-transitory computer-readable medium including one or more sequences of instructions which, when executed by one or more processes, causes:

connecting, by a mobile device, a voice call for a user of the mobile device, wherein connecting the voice call causes one or more radio frequency transmitters of the mobile device to transmit radio waves at a transmit power level;

obtaining motion data describing movement of the mobile device, wherein the motion data comprises an acceleration signal corresponding to an acceleration of the mobile device over a period of time;

obtaining proximity data describing a proximity of the mobile device to an object;

distinguishing between the mobile device being on the user's body or the mobile device being on an inanimate object based on the motion data and the proximity data, wherein distinguishing between the mobile device being on the user's body or the mobile device being on an inanimate object comprises:

determining a motion state of the mobile device based on the motion data, wherein determining the motion state based on the motion data comprises:

calculating a first power of the acceleration signal within a first frequency band;

calculating a second power of the acceleration signal within a second frequency band, wherein the second frequency band is higher than the first frequency band; and determining the motion state of the mobile device based on the first power and the second power;

determining a proximity state of the mobile device based on the proximity data; and distinguishing between the mobile device being on the user's body or the mobile device being on an inanimate object based on the determined motion state and the determined proximity state;

adjusting the transmit power level based on distinguishing between the mobile device being on the user's body or the mobile device being on an inanimate.

11. The non-transitory computer-readable medium of claim 10, wherein determining the motion state of the mobile device based on the motion data further comprises:

predicting whether the mobile device is on the user's body or on an inanimate object based on the motion data and not the proximity data;

determining that the mobile device is in an on-object motion state upon predicting that the mobile device is on an inanimate object; and determining that the mobile device is in an on-body motion state upon predicting that the mobile device is on the user's body.

12. The non-transitory computer-readable medium of claim 11, wherein determining the proximity state of the mobile device based on the proximity data comprises:

determining a distance between the mobile device and the detected object using the proximity data and not the motion data;

determining that the mobile device is in a near proximity state when the mobile device is within a first distance from the detected object;

determining that the mobile device is in an intermediate proximity state when the mobile device is between a second distance and the first distance from the detected object, where the second distance is greater than the first distance; and determining that the mobile device is in a far proximity state when the mobile device is further than the second distance away from the detected object.

13. The non-transitory computer-readable medium of claim 12, wherein distinguishing between the mobile device being on the user's body or the mobile device being on an inanimate object based on the determined motion state and the determined proximity state comprises:

determining that the mobile device is on the user's body when the mobile is device is in an on-body motion state and the near proximity state.

14. The non-transitory computer-readable medium of claim 10, wherein determining the motion state of the mobile device based on the first power and the second power comprises:

calculating a ratio between the second power and the first power;

comparing the ratio to a threshold ratio value;

determining that the mobile device is in an on-object motion state when the ratio is greater than the threshold value.

15. The non-transitory computer-readable medium of claim 14, wherein the threshold ratio value is dependent on at least the first power or the second power.

16. The non-transitory computer-readable medium of claim 10, wherein determining the motion state of the mobile device based on the motion data further comprises:

calculating a third power of the acceleration signal within a third frequency band, wherein the third frequency band is different than the first frequency band and the second frequency band; and determining the motion state of the mobile device based further on the third power.

17. The non-transitory computer-readable medium of claim 10, wherein adjusting the transmit power level comprises:

determining that the mobile device is on the user's body; and responsive to determining that the mobile device is on the user's body, reducing the transmit power level.

18. The non-transitory computer-readable medium of claim 10, wherein adjusting the transmit power level comprises:

determining that the mobile device is on an inanimate object; and responsive to determining that the mobile device is on an inanimate object, increasing the transmit power level.

19. A system comprising:

one or more processors; and a non-transitory computer-readable medium including one or more sequences of instructions which, when executed by the one or more processes, causes:

connecting, by a mobile device, a voice call for a user of the mobile device, wherein connecting the voice call causes one or more radio frequency transmitters of the mobile device to transmit radio waves at a transmit power level;

obtaining motion data describing movement of the mobile device, wherein the motion data comprises an acceleration signal corresponding to an acceleration of the mobile device over a period of time;

obtaining proximity data describing a proximity of the mobile device to an object;

distinguishing between the mobile device between on the user's body or the mobile device being on an inanimate object based on the motion data and the proximity data, wherein distinguishing between the mobile device being on the user's body or the mobile device being on an inanimate object comprises:

determining a motion state of the mobile device based on the motion data, wherein determining the motion state based on the motion data comprises:

calculating a first power of the acceleration signal within a first frequency band;

calculating a second power of the acceleration signal within a second frequency band, wherein the second frequency band is higher than the first frequency band; and determining the motion state of the mobile device based on the first power and the second power;

determining a proximity state of the mobile device based on the proximity data; and distinguishing between the mobile device being on the user's body or the mobile device being on an inanimate object based on the determined motion state and the determined proximity state; and adjusting the transmit power level based on distinguishing between the mobile device being on the user's body or the mobile device being on an inanimate object.

20. The system of claim 19, wherein determining the motion state of the mobile device based on the motion data comprises:

predicting whether the mobile device is on the user's body or on an inanimate object based on the motion data and not the proximity data;

determining that the mobile device is in an on-object motion state upon predicting that the mobile device is on an inanimate object; and determining that the mobile device is in an on-body motion state upon predicting that the mobile device is on the user's body.

21. The system of claim 20, wherein determining the proximity state of the mobile device based on the proximity data comprises:

determining a distance between the mobile device and the detected object using the proximity data and not the motion data;

determining that the mobile device is in a near proximity state when the mobile device is within a first distance from the detected object;

determining that the mobile device is in an intermediate proximity state when the mobile device is between a second distance and the first distance from the detected object, where the second distance is greater than the first distance; and determining that the mobile device is in a far proximity state when the mobile device is further than the second distance away from the detected object.

22. The system of claim 21, wherein distinguishing between the mobile device being on the user's body or the mobile device being on an inanimate object based on the determined motion state and the determined proximity state comprises:

determining that the mobile device is on the user's body when the mobile is device is in an on-body motion state and the near proximity state.

23. The system of claim 19, wherein determining the motion state of the mobile device based on the first power and the second power comprises:
   calculating a ratio between the second power and the first power;
   comparing the ratio to a threshold ratio value;
   determining that the mobile device is in an on-object motion state when the ratio is greater than the threshold value.

24. The system of claim 23, wherein the threshold ratio value is dependent on at least the first power or the second power.

25. The system of claim 19, wherein determining the motion state of the mobile device based on the motion data further comprises:
   calculating a third power of the acceleration signal within a third frequency band, wherein the third frequency band is different than the first frequency band and the second frequency band; and
   determining the motion state of the mobile device based further on the third power.

26. The system of claim 19, wherein adjusting the transmit power level comprises:
   determining that the mobile device is on the user's body; and
   responsive to determining that the mobile device is on the user's body, reducing the transmit power level.

27. The system of claim 19, wherein adjusting the transmit power level comprises:
   determining that the mobile device is on an inanimate object; and
   responsive to determining that the mobile device is on an inanimate object, increasing the transmit power level.

* * * * *

UNITED STATES PATENT AND TRADEMARK OFFICE
CERTIFICATE OF CORRECTION

PATENT NO. : 9,699,739 B2  
APPLICATION NO. : 14/292750  
DATED : July 4, 2017  
INVENTOR(S) : Ben-Heng Juang et al.

Page 1 of 1

It is certified that error appears in the above-identified patent and that said Letters Patent is hereby corrected as shown below:

In the Claims

Column 17, Line 41, Claim 4, after "mobile" delete "is";

Column 19, Line 18, Claim 13, after "mobile" delete "is"; and

Column 21, Line 2, Claim 22, after "mobile" delete "is".

Signed and Sealed this  
Tenth Day of October, 2017

Joseph Matal  
*Performing the Functions and Duties of the*  
*Under Secretary of Commerce for Intellectual Property and*  
*Director of the United States Patent and Trademark Office*